(12) United States Patent
Li et al.

(10) Patent No.: US 7,953,050 B2
(45) Date of Patent: May 31, 2011

(54) RELAY TRANSMISSION METHOD AND APPARATUS

(75) Inventors: Zhongfeng Li, Shenzhen (CN); Zheng Shang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/982,384

(22) Filed: Dec. 30, 2010

(65) Prior Publication Data

US 2011/0085478 A1    Apr. 14, 2011

Related U.S. Application Data

(63) Continuation of application No. PCT/CN2009/074506, filed on Oct. 19, 2009.

(30) Foreign Application Priority Data

Oct. 24, 2008  (CN) .......................... 2008 1 0170763
Feb. 2, 2009   (CN) .......................... 2009 1 0009900

(51) Int. Cl.
*H04J 3/00* (2006.01)

(52) U.S. Cl. ........ 370/336; 370/276; 370/280; 370/294; 455/450

(58) Field of Classification Search .................. 370/276, 370/280, 294, 329, 336; 455/450, 436
See application file for complete search history.

(56) References Cited

U.S. PATENT DOCUMENTS

| | | |
|---|---|---|
| 2004/0266339 A1 | 12/2004 | Larsson |
| 2007/0217367 A1* | 9/2007 | Lee et al. ....................... 370/335 |
| 2008/0039011 A1 | 2/2008 | Chang et al. |
| 2008/0095195 A1* | 4/2008 | Ahmadi et al. ................ 370/478 |
| 2008/0107062 A1 | 5/2008 | Viorel et al. |
| 2008/0151809 A1 | 6/2008 | Chindapol et al. |
| 2008/0186950 A1 | 8/2008 | Zhu et al. |
| 2009/0117901 A1* | 5/2009 | Zhao et al. ..................... 455/436 |

(Continued)

FOREIGN PATENT DOCUMENTS

CN          101022666 A        8/2007

(Continued)

OTHER PUBLICATIONS

"R1-083191: Operation of Relays in LTE-A," 3GPP TSG-RAN WG1 #54, http://www.3gpp.org/FTP/Specs/html-info/TDocExMtg--R1-54--26793.htm, Qualcomm Europe, Jeju, S. Korea, Aug. 18-22, 2008, pp. 1-5.

(Continued)

*Primary Examiner* — Albert T Chou
(74) *Attorney, Agent, or Firm* — Slater & Matsil, L.L.P.

(57) ABSTRACT

A relay transmission method and apparatus are provided. The method includes: configuring a subframe of a Time Division Duplex (TDD) relay frame for a subframe of relay link (S201), where the configuring the subframe of the TDD relay frame for the subframe of relay link includes: configuring a downlink (DL) subframe of the TDD relay frame for a DL subframe of relay link, and/or configuring the DL subframe of the TDD relay frame for an uplink (UL) subframe of relay link, and/or configuring a UL subframe of the TDD relay frame for the UL subframe of relay link; and performing relay transmission according to the subframe of relay link (S202). When data is transmitted, a subframe that can be used for relay link transmission is configured, data transmission performed by using relay link complies with inherent constraints of a TDD frame structure in the prior art.

5 Claims, 13 Drawing Sheets

U.S. PATENT DOCUMENTS

| | | | |
|---|---|---|---|
| 2009/0180410 A1* | 7/2009 | Lee et al. | 370/294 |
| 2009/0185632 A1* | 7/2009 | Cai et al. | 375/260 |
| 2010/0008282 A1 | 1/2010 | Bhattad et al. | |
| 2010/0080166 A1* | 4/2010 | Palanki et al. | 370/315 |
| 2010/0189081 A1* | 7/2010 | Zhang et al. | 370/336 |

FOREIGN PATENT DOCUMENTS

| | | |
|---|---|---|
| CN | 101162936 A | 4/2008 |
| CN | 101166055 A | 4/2008 |
| WO | WO 2007/064252 A1 | 6/2007 |
| WO | WO 2008/006693 A1 | 1/2008 |
| WO | WO 2008/049843 A1 | 5/2008 |

OTHER PUBLICATIONS

Bhattad, K., et al., Specification, Drawings and Filing Receipt for U.S. Appl. No. 61/080,025, filed Jul. 11, 2008, entitled "Enabling Communications in the Presence of Dominant Interferer," 29 pages.

* cited by examiner

RELAY TRANSMISSION METHOD AND APPARATUS

This application is a continuation of International Application No. PCT/CN2009/074506, filed on Oct. 19, 2009, which claims priority to Chinese Patent Application No. 200810170763.5, filed on Oct. 24, 2008, and Chinese Patent Application No. 200910009900.1, filed on Feb. 2, 2009, all of which are hereby incorporated by reference in their entireties.

TECHNICAL FIELD

The present invention relates to the field of communication technologies, and in particular, to a relay transmission method and apparatus.

BACKGROUND

With the development of wireless communication technologies, requirements on the communication rate and communication quality are raised. Though wired transmission meets the requirements on the communication rate and the communication quality to some extent, the wired transmission requires an operator to lay fiber optic cables or rent cable resources, which limits the application of the wired transmission. The problem is effectively solved by using a relay for wireless backhauling. The implementation of the relay technology may expand the coverage of the cell, improve the cell capacity, and achieve the uniform cell throughput. The introduction of the relay may also bring changes to a frame structure of an original system.

FIG. 1 is a schematic view of a relay frame structure in the prior art, where the relay frame structure is applicable to time division duplex (TDD). Referring to FIG. 1, a base station (e.g. enhanced node base (eNB)) and a Relay Node/Relay (RN) as well as the RN and a user equipment (UE) communicate through subframes 1 to 4. Subframe 1 is used for a downlink (DL) relay link transmission from eNB to Relay, subframe 2 is used for a DL access link transmission from Relay to UE, subframe 3 is used for an uplink (UL) relay link transmission from Relay to eNB, and subframe 4 is used for a UL access link transmission from UE to Relay.

During the implementation of the present invention, the inventors find that the prior art has at least the following problem.

In an existing relay system, when data transmission is performed according to the TDD frame structure in the prior art, relay transmission cannot be realized.

SUMMARY OF THE INVENTION

The present invention is directed to a relay transmission method and apparatus, so that an RN in a TDD system can perform relay transmission.

In order to achieve the above objective, an embodiment of the present invention provides a relay transmission method, where the method includes: configuring a subframe of a TDD relay frame for a subframe of relay link, where the configuring the subframe of the TDD relay frame for the subframe of relay link includes: configuring a DL subframe of the TDD relay frame for a DL subframe of relay link, and/or configuring the DL subframe of the TDD relay frame for a UL subframe of relay link, and/or configuring a UL subframe of the TDD relay frame for a UL subframe of relay link; and performing relay transmission according to the subframe of relay link.

An embodiment of the present invention provides a communication apparatus, where the communication apparatus includes: a configuring module, configured to configure a subframe of a TDD relay frame for a subframe of relay link, where the configuring the subframe of the TDD relay frame for the subframe of relay link includes: configuring a DL subframe of the TDD relay frame for a DL subframe of relay link, and/or configuring the DL subframe of the TDD relay frame for a UL subframe of relay link, and/or configuring a UL subframe of the TDD relay frame for the UL subframe of relay link; and a transmitting module, configured to perform relay transmission according to the subframe of relay link configured by the configuring module.

In the technical solutions according to the embodiments of the present invention, when a communication apparatus transmits data, a subframe that can be used for relay link transmission is configured, data transmission performed by using relay link complies with inherent constraints of a TDD frame structure in the prior art, and coverage of a system using a TDD relay frame is expanded, thus improving the throughput.

BRIEF DESCRIPTION OF THE DRAWINGS

To illustrate the technical solutions according to the embodiments of the present invention or in the prior art more clearly, the accompanying drawings for describing the embodiments or the prior art are given briefly below. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

The technical solutions of the present invention will be clearly and completely described in the following with reference to the accompanying drawings. It is obvious that the embodiments to be described are only a part rather than all of the embodiments of the present invention. Persons of ordinary skill in the art can derive other embodiments from the embodiments given herein without making any creative effort, and all such embodiments are covered in the protection scope of the present invention.

Figure 1:
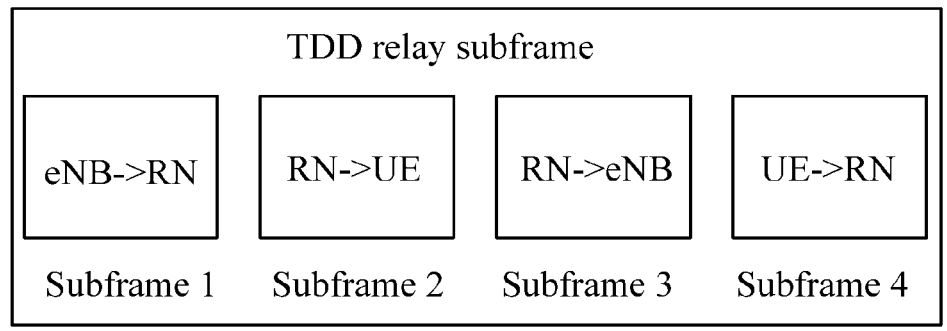
FIG. 1 is a schematic view of a relay frame structure in the prior art.
Figure 2:
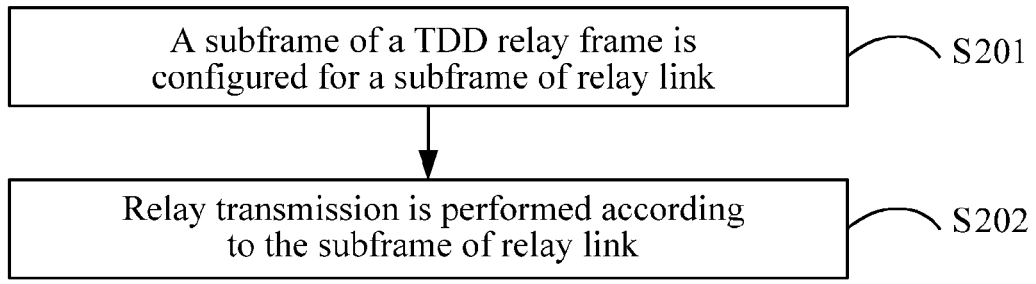
FIG. 2 is a flow chart of a relay transmission method according to an embodiment of the present invention.

FIG. 2 is a flow chart of a relay transmission method according to an embodiment of the present invention, and as shown in FIG. 2, the relay transmission method includes the following steps.

In step S201, a subframe of a TDD relay frame is configured for a subframe of relay link.

The configuring the subframe of the TDD relay frame for the subframe of relay link includes: configuring a DL subframe of the TDD relay frame for a DL subframe of relay link, and/or configuring the DL subframe of the TDD relay frame for a UL subframe of relay link, and/or configuring a UL subframe of the TDD relay frame for the UL subframe of relay link.

In step S202, relay transmission is performed according to the subframe of relay link.

When the relay transmission is performed according to the configured subframe of relay link, if the DL subframe of the relay frame is used as the UL subframe of relay link or the DL subframe of relay link, the first N orthogonal frequency division multiplexing (OFDM) symbols of the DL subframe are configured for access link transmission between a RN and a UE under the RN or between an eNB and a UE under the eNB, and are configured to send a DL reference signal, or a DL reference signal and control signaling. Other OFDM symbols of the DL subframe are used for relay link transmission and/or a guard period (GP); that is to say, the time other than the first N OFDM symbols of the DL subframe is used for the relay link transmission and/or the GP.

The DL subframe includes M OFDM symbols, M and N are natural numbers, and N is smaller than M.

The solution provided by the embodiment of the present invention can be applied to systems such as long term evolution (LTE), LTE advanced (LTE-A), all versions of the LTE (such as Rel-8, Rel-9, and Rel-10), world interoperability for microwave access (WiMax), and ultra wideband wireless communication (UWB).

For example, in an LTE/LTE-A system, a communication apparatus transmits data according to a TDD relay frame. Each frame of the TDD relay frame includes 10 subframes, the length of each frame is 10 ms, and the length of each of the subframes is 1 ms. The LTE/LTE-A TDD relay frame includes a subframe of relay link, an access link subframe, and a GP. The subframe of relay link occupies one or more subframes. The access link subframe occupies one or more subframes. The GP occupies a part of a special LTE/LTE-A TDD subframe, or the GP occupies a part of the subframe of relay link. Communication between an eNB and a UE served by the eNB is performed according to the subframe of relay link; and/or communication between an eNB and an RN is performed according to the subframe of relay link; and/or communication between an RN and a UE served by the RN is performed according to the subframe of relay link. When the eNB or the RN performs relay transmission, TDD frames with the same ratio of the DL subframes to the UL subframes may be used, or frames of the same configuration may be used. The GP specifically includes: a receive-transmit state transition time and an idle time. The receive-transmit state transition time is a receive-transmit state transition time of the eNB and/or a receive-transmit state transition time of the RN. The GP is an integer multiple of a sampling time, or, the GP is a time when the number of sampling points is a divisor of the number of Fourier transform points and the number of the sampling points is the number of the Fourier transform points/$2^n$, where n is a natural number. Or, the GP may also be obtained from at least one among a cyclic prefix of the OFDM symbol, the OFDM symbol, and the subframe. Or, the GP is adjusted in signaling by a transmitter and a receiver.

For all the embodiments of the present invention, in all the accompanying drawings, D represents a subframe of DL, U represents a subframe of UL, and S represents a special subframe in an LTE/LTE-A TDD system. The special subframe includes a downlink pilot timeslot (DwPTS), an uplink pilot timeslot (UpPTS), and a GP. Similarly, in all the tables, D also represents a DL subframe, U represents a UL subframe, and S represents a special subframe for a DwPTS, an UpPTS, and a GP.

In a TDD relay frame structure, if a UE sends a Physical Uplink Shared Channel (PUSCH) in subframe n, the UE receives a physical hybrid automatic repeat request (HARQ) indication channel (PHICH) in a $k^{th}$ subframe after subframe n, that is, DL subframe n+k, where values of n and k (values of k are as shown in configuration rows 0 to 6) are provided in Table 1.

TABLE 1

| TDD UL/DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

For example, in Table 1, for a 3rd subframe (n=3) in a frame, in the 0th configuration row, k is correspondingly equal to 7; a UE sends a PUSCH in the 3rd subframe, and receives a PHICH in a 0th subframe (3+7) of a next frame. For another configuration, for example, in the 1st configuration row, k is correspondingly equal to 6; the UE sends a PUSCH in the 3rd subframe, and receives a PHICH in a 9th subframe (3+6).

In the TDD relay frame structure, if the UE receives a physical downlink shared channel (PDSCH) in subframe n, the UE sends an acknowledgement/negative acknowledgement (ACK/NACK) in subframe n+k, where values of n and k (values of k are as shown in configuration rows 0 to 6) are provided in Table 2.

TABLE 2

| | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |

TABLE 2-continued

| Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

For example, in Table 2, for a $3^{rd}$ subframe (n=3) in a frame, in the $2^{nd}$ configuration row, k is correspondingly equal to 4; a UE receives a PDSCH in the $3^{rd}$ subframe, and sends an ACK/NACK in a $7^{th}$ subframe (3+4). For another configuration, for example, in the $5^{th}$ configuration row, k is correspondingly equal to 9; the UE receives a PDSCH in the $3^{rd}$ subframe of UL, and sends an ACK/NACK in a $2^{nd}$ subframe (3+9) of a next frame.

In the TDD Relay frame structure, if the UE receives a UL grant/PHICH in subframe n (transfers UL data/or ANK/NACK of a UL PUSCH), the UE sends the PUSCH in subframe n+k. Correspondence relations between the UL grant/PHICH and the PUSCH are as shown in Table 3 (in the following tables, the UL grant can be replaced with the PHICH, which is not indicated again hereinafter).

TABLE 3

| TDD UL/DL Configuration | DL/UL ratio UL grant VS. PUSCH | Subframe index n | | | | | | | | | |
|---|---|---|---|---|---|---|---|---|---|---|---|
| | | 0 | 1 | 2 | 3 | 4 | 5 | 6 | 7 | 8 | 9 |
| 0 | 1:3 | D | S | U | U | U | D | S | U | U | U |
| | UL grant VS. PUSCH | G0-4 | G1-6 | | | | G5-4 | G6-6 | | | |
| | | G0-7 | G1-7 | | | | G5-7 | G6-7 | | | |
| 1 | 2:2 | D | S | U | U | D | D | S | U | U | D |
| | UL grant VS. PUSCH | | G1-6 | | | G4-4 | | G6-6 | | | G9-4 |
| 2 | 3:1 | D | S | U | D | D | D | S | U | D | D |
| | UL grant VS. PUSCH | | | | G3-4 | | | | | G8-4 | |
| 3 | 6:3 | D | S | U | U | D | D | D | D | D | D |
| | UL grant VS. PUSCH | G0-4 | | | | | | | | G8-4 | G9-4 |
| 4 | 7:2 | D | S | U | U | D | D | D | D | D | D |
| | UL grant VS. PUSCH | | | | | | | | | G8-4 | G9-4 |
| 5 | 8:1 | D | S | U | D | D | D | D | D | D | D |
| | UL grant VS. PUSCH | | | | | | | | | G8-4 | |
| 6 | 3:5 | D | S | U | U | U | D | S | U | U | D |
| | UL grant VS. PUSCH | G0-7 | G1-7 | | | | G5-7 | G6-7 | | | G9-5 |

In Table 3, G represents a grant (scheduling UL data signaling), Gn-k represents that when a UE receives a UL grant in subframe n, the UE sends a PUSCH in subframe n+k. For example, in a $1^{st}$ subframe, when a ratio of DL subframes to UL subframes is 2:2, a correspondence relation between the UL grant and the PUSCH is G1-6. That is to say, when the UE receives a UL grant in the $1^{st}$ subframe, the UE sends a PUSCH in a $7^{th}$ subframe (1+6).

Figure 3:
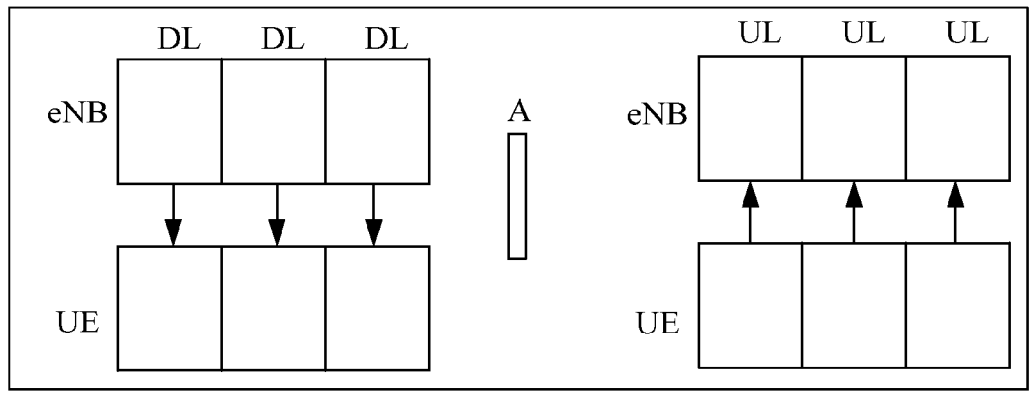
FIG. 3 is a schematic view of TDD with no relay transmission frame structure introduced according to an embodiment of the present invention.
Figure 4:
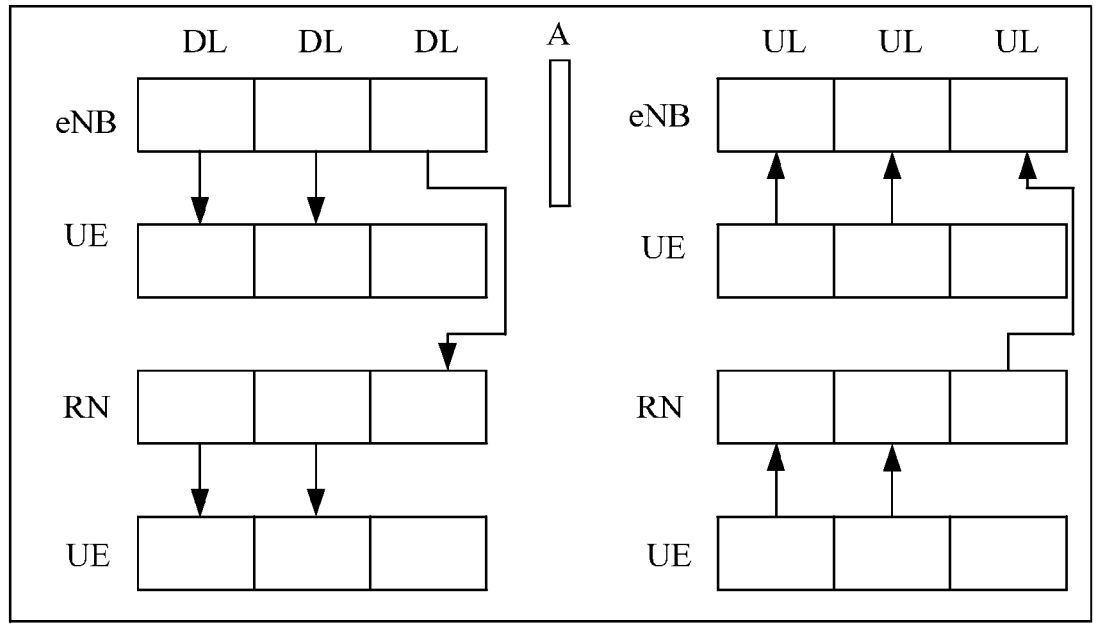
FIG. 4 is a schematic view of a frame structure using a complete subframe as a relay link according to an embodiment of the present invention.
Figure 5:
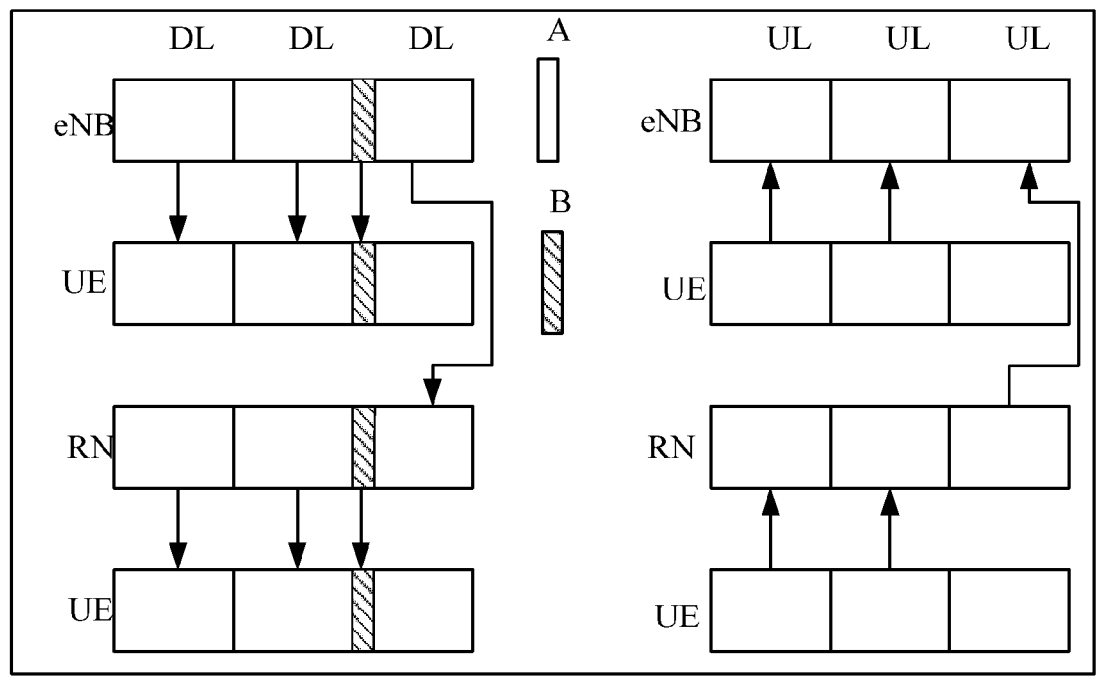
FIG. 5 is a schematic view of a frame structure using an original DL subframe as a DL relay link and using an original UL subframe as a UL relay link according to an embodiment of the present invention.
Figure 6:
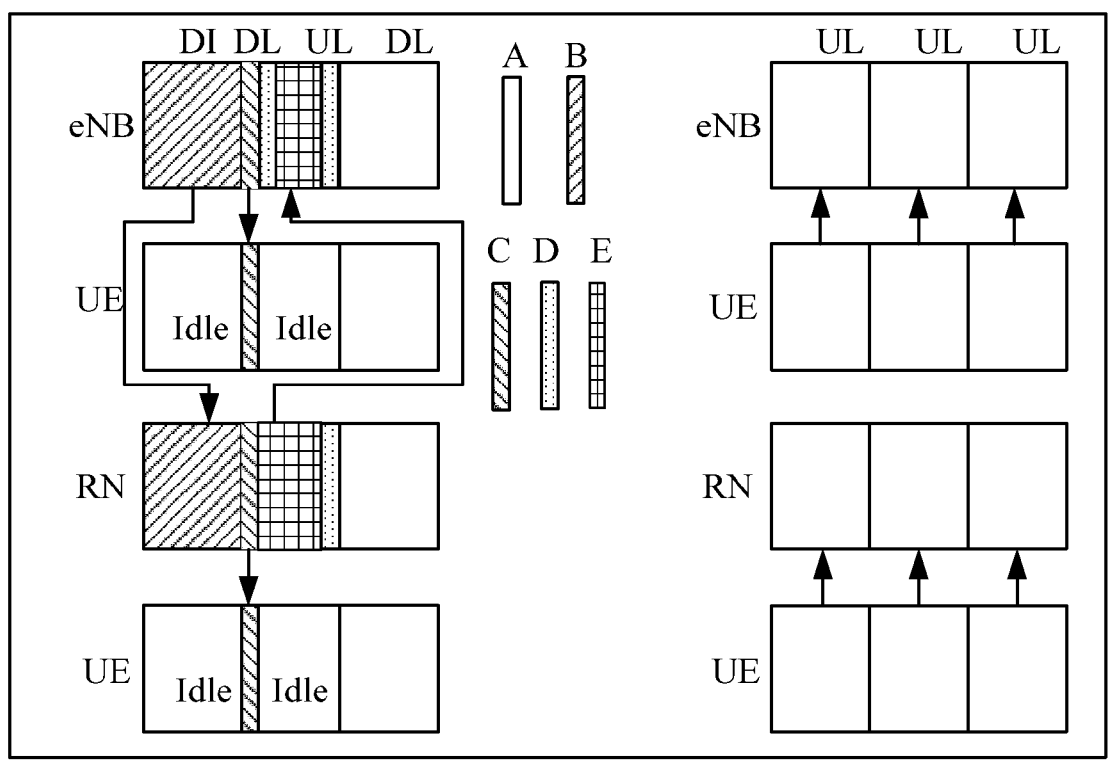
FIG. 6 is a schematic view of a frame structure of a system including an eNB, an RN, and a UE according to an embodiment of the present invention.

FIG. 3 is a schematic view of TDD with no relay transmission frame structure introduced according to an embodiment of the present invention. Pattern A represents a time unit of DL and UL communication performed by an eNB and a UE_eNB (a UE served by the eNB). In FIG. 3, the time unit is a subframe (the length of one subframe is 1 ms). Each DL subframe is configured for DL communication from eNB to UE_eNB, and each UL subframe is configured for UL communication from UE_eNB to eNB. When a frame structure for relay transmission is introduced into the TDD, as shown in FIG. 4, which is a schematic view of a frame structure using a complete subframe for a relay link according to an embodiment of the present invention, in FIG. 4, for the DL, one or more subframes may be used for relay link between an eNB and an RN, and similarly, for the UL, one or more subframes may be used for relay link from the RN to the eNB. When the relay link are exclusively used for the UL and DL communication between the eNB and the RN, the relay link are called dedicated relay link. When the relay link are used for both the communication between the eNB and the RN and the communication between the eNB and the UE_eNB, the relay link are called non-dedicated relay link. The number of the subframes used for the relay link of the UL may be the same as or different from the number of the subframes used for the relay link of the DL. In FIG. 4, the DL relay link and the UL relay link of the RN may occupy a complete subframe of relay link, or occupy a part of the subframe of relay link excluding a GP. A frame structure for relay transmission is introduced into the TDD, as shown in FIG. 5, which is a schematic view of a frame structure using an original DL subframe for a DL relay link and using an original UL subframe for a UL relay link according to an embodiment of the present invention. In FIG. 5, patterns A represent communication link between an eNB and a UE_eNB, between the eNB and an RN, and between the RN and a UE_RN, which can be configured to transmit channels used by the LTE such as a control channel, a data channel, a reference signal, a synchronization channel, or a broadcast channel. In order to perform channel interpolation between time-domain DL subframes, first several (1, 2, 3, or 4) OFDM symbols of a subframe of the DL relay link, indicated by patterns B in FIG. 5, are used for an access link between the eNB and the UE_eNB and an access link between the RN and the UE_RN. The access link (patterns B) is configured to send a reference signal, a control channel, a PHICH, or a Physical Control Format Indicator Channel (PCFICH). For example, only the DL reference signal is sent, or the DL reference signal and the control signaling such as a Physical Downlink Control Channel (PDCCH), the PHICH, or the PCFICH are sent. In an LTE/LTE-A TDD system, a DL subframe of pattern B may be a Multimedia Broadcast multicast service over a Single Frequency Network (MBSFN) subframe, and in this case, pattern B is equivalent to a unicast part of the MBSFN subframe, and is configured to, for example, send a DL reference signal, or a DL reference signal and control signaling such as a control channel, a PHICH, or a PCFICH, on an access link between an RN and a UE_RN. The rest of the MBSFN subframe is used for DL communication between an eNB and the RN and a GP, or is also used for communication between the eNB and a UE_eNB at the same time. The subframe of the eNB with pattern B may be a normal subframe, and in this case, pattern B is equivalent to a control channel part in the front of the normal subframe. The reference signal is sent in pattern B, so that channel estimation interpolation can be performed between the sent reference signal and a reference signal of a previous subframe, thus further improving the channel estimation performance. A frame structure for relay transmission is introduced into the TDD relay frame structure, as shown in FIG. 6, which is a schematic view of a frame structure of a system including an eNB, an RN, and a UE according to an embodiment of the present invention. Patterns A represent link through which the eNB and the UE_eNB perform DL and UL communication, and link through which the RN and the UE_RN perform DL and UL communication. Pattern B represents a DL relay link from the eNB to the RN, which can be configured to send a control channel, a data channel, or a reference signal, and the control channel, the data channel, or the reference signal may also be sent to the UE_eNB at the same time. Patterns C represent DL access link, respectively from the eNB to the UE_eNB and from the RN to the UE_RN, and configured to transmit channels such as a PHICH, a UL grant, a PCFICH, or a DL reference signal. Occupied first several (1, 2, 3, or 4) OFDM symbols of a subframe with pattern C are used for the DL access link from the eNB to the UE_eNB and the DL access link from the RN to the UE_RN, and configured to transmit information including control signaling such as a PHICH, a UL grant, and a PCFICH, and/or a DL reference signal. Pattern E represents a corresponding part of an original DL subframe from the eNB to the UE_eNB transmission after being converted to a UL from the RN to the eNB transmission, that is, the subframe of pattern E, so that the original DL subframe is used as a UL subframe of relay link. In the LTE/LTE-A TDD system, the DL subframe of pattern E may be an MBSFN subframe, pattern C is equivalent to a unicast part of the MBSFN subframe, and is configured to send a DL reference signal, and/or control signaling such as a PDCCH, a PHICH, or a PCFICH on an access link between the eNB and the UE_eNB and an access link between the RN and the UE_RN. The rest of the MBSFN subframe is used for UL communication between the eNB and the RN and a GP. Pattern D represents a GP, and the GP includes a receive-transmit state transition time and an idle time. The receive-transmit state transition time is a receive-transmit state transition time of the eNB and/or a receive-transmit state transition time of the RN. The length of the GP may be an integer multiple of a sampling time, or be equal to [N/(2^n)× the sampling time], where N is the number of Fourier transform points used in the LTE/LTE-A system, n is a natural number such as 1, 2, 3, . . . , and $2^n \leq N$. Pattern E represents a UL relay link from the RN to the eNB.

In FIG. 6, pattern A of the UL part may be used for a UL access link for transmission from the UE_eNB to the eNB, and may also be used for a UL access link for transmission from the UE_RN to the RN. Pattern A of the DL part may be used for a DL access link for transmission from the eNB to the UE_eNB, and may also be used for a DL access link for transmission from the RN to the UE_RN. Pattern B of the DL part may be used for a DL relay link for transmission from the eNB to the RN, and may also be used for a mixed link of a DL access link for transmission from the eNB to the RN and a DL access link for transmission from the eNB to the UE_eNB. Pattern B is used for a relay link from the eNB to the RN, and if the throughput required by the relay link does not need to use all the resources of pattern B, pattern B may also transmit one or all of a data channel, a control channel, and a reference signal channel from the eNB to the UE_eNB at the same time. Pattern D represents a time during which the eNB and/or the RN does not transmit data, and may be used as the receive-transmit state transition time of the eNB and/or the receive-transmit or transmit-receive transition time of the RN, or an idle time. As shown in FIG. 6, pattern D may also exist between pattern C of the RN and pattern E of the RN, and pattern D depends on whether a propagation time between the eNB and the RN meets the transmit-receive transition time of the eNB. When the propagation time between the eNB and the RN is longer than the receive-transmit transition time, the first pattern D of the eNB in the subframe of the UL is required to be longer than the receive-transmit transition time. When the propagation time is shorter than the receive-transmit transition time, pattern D is required to be added between pattern C of the RN and pattern E of the RN, and the length of the time (pattern D) equals a difference between a transmit-receive transition time of the eNB and a transmission time from the RN to the eNB. That is to say, the time length of pattern D may vary in different positions, but pattern D is placed within the subframe of the relay link. The above transition time or transmission time (for example, pattern D in FIG. 6) may also be adjusted by a transmitter and a receiver in signaling, for example, regularly, and not indicated in the frame structure.

In view of the above, in this embodiment, when a communication apparatus transmits data, a subframe that can be used for relay link transmission is configured, data transmission performed by using relay link complies with inherent constraints of Rel-8 of the LTE system, and coverage of the LTE system using the LTE/LTE-A TDD relay frame is expanded, thus improving the throughput.

In all of the embodiments of the present invention, the ratio of the DL subframes to the UL subframes is the ratio of the DL subframes to the UL subframes when the relay is not introduced. After the relay is introduced, the ratio of the DL subframes to the UL subframes may change, which depends on actual applications.

An embodiment of the present invention provides a frame structure, where a ratio of LTE/LTE-A TDD relay frames is a ratio of DL subframes to UL subframes being 6:3. In this embodiment, a correspondence relation between a UL grant and a PUSCH is shown in Table 4. For example, if a UE receives a UL grant sent to the UE in subframe 0, the UE shall send a PUSCH in a corresponding subframe 4. If the UE receives a UL grant sent to the UE in subframe 8/9, the UE shall send a PUSCH in a corresponding subframe 2/3 of a next frame.

TABLE 4

| TDD UL/DL Configuration | DL/UL ratio UL grant VS. PUSCH | Subframe index n | | | | | | | | | |
|---|---|---|---|---|---|---|---|---|---|---|---|
| | | 0 | 1 | 2 | 3 | 4 | 5 | 6 | 7 | 8 | 9 |
| 3 | 6:3 UL grant VS. PUSCH PUSCH Position | D G0-4 | S | U | U | U | D | D | D | D G8-4 | D G9-4 |

A correspondence relation between a PHICH and a UL ACK/NACK is shown in Table 5. In Table 5, patterns being the same have a corresponding relation. For example, when the UE sends the PUSCH in subframe 4, accordingly, the UE sends the PHICH in the position of subframe 0 of a next frame; when a PDSCH is sent in subframe 0, and the UL ACK/NACK is sent in subframe 4 of this frame.

TABLE 5

| TDD UL/DL Configuration | UL subframe index n |  |  |  |  |  |  |  |  |  |
|---|---|---|---|---|---|---|---|---|---|---|
| | 0 | 1 | 2 | 3 | 4 | 5 | 6 | 7 | 8 | 9 |
| 3 PUSCH PHICH position | | 6 | 6 | 6 | 6 | | | | 6 | 6 |

| | DL Subframe index n |  |  |  |  |  |  |  |  |  |
|---|---|---|---|---|---|---|---|---|---|---|
| Configuration | 0 | 1 | 2 | 3 | 4 | 5 | 6 | 7 | 8 | 9 |
| 3 PDSCH ULACK position | 4 | 11 | — 11 7 6 | — 6 5 | — 4 5 | | | 7 | 6 | 6 5 5 |

In an LTE TDD frame structure, subframes 0, 1, 5, and 6 are configured to send a Primary Broadcast Channel (P-BCH), a Dynamic Broadcast Channel (D-BCH), or a Primary/Secondary Synchronization Channel (P/S-SCH). In the frame structure, subframes 0, 1, 5, and 6 cannot be configured for a DL relay link, and as seen from Table 5, available DL relay subframes can only be subframes 7, 8, and 9. From Table 5, it can also be seen that subframes 0, 1, 5, and 6 respectively correspond to subframes 2 and 4 in where UL ACK/NACK is transmitted. Therefore, subframes 2 and 4 cannot be used for a UL relay link. As seen from Table 5, only subframe 3 can be used for a UL relay link. The UE receives the PDSCH in subframes 7 and 8. Accordingly, the UE is required to send the UL ACK/NACK in subframe 3 (7+6 or 8+5) of a next frame, and meanwhile subframes 7 and 8 may be used for a DL relay link. From Table 4, it can be seen that a PUSCH of subframe 2 of a next frame is required to be sent in subframe 8. If subframe 8 is not configured for sending a UL grant, the PUSCH cannot be sent in subframe 2, thus wasting the resources. Therefore, first several (1, 2, 3, or 4) OFDM symbols of subframe 8 can be configured for transmission of an access link. Through the first several symbols of subframe 8, control signaling such as a DL control channel, a PCFICH, or a PHICH, and/or a reference signal can be sent between the eNB and the UE_eNB, and the control signaling such as the DL control channel, the PCFICH, or the PHICH, and/or the reference signal can be sent between the RN and the UE_RN. As can be seen from Table 4, when the UL grant is sent in the subframe 9 of a previous frame, the PUSCH is required to be sent in subframe 3 of this frame, and subframe 3 is used for a relay link between the RN and the eNB; and when the PUSCH is sent in subframe 3, the RN cannot receive the data sent by the UE_RN, so that in the above configuration, subframe 9 of the previous frame cannot be configured for sending the UL grant control channel of the PDCCH to schedule UL data. Therefore, one or more among subframes 3, 7, 8, and 9 may be configured for DL subframes of relay link, and the rest subframes may be used as UL subframes of relay link. The number of the subframes that are used as the UL subframes of relay link is greater than or equal to 1, and subframe 3 can only be used as the UL subframe of relay link.

Figure 7:
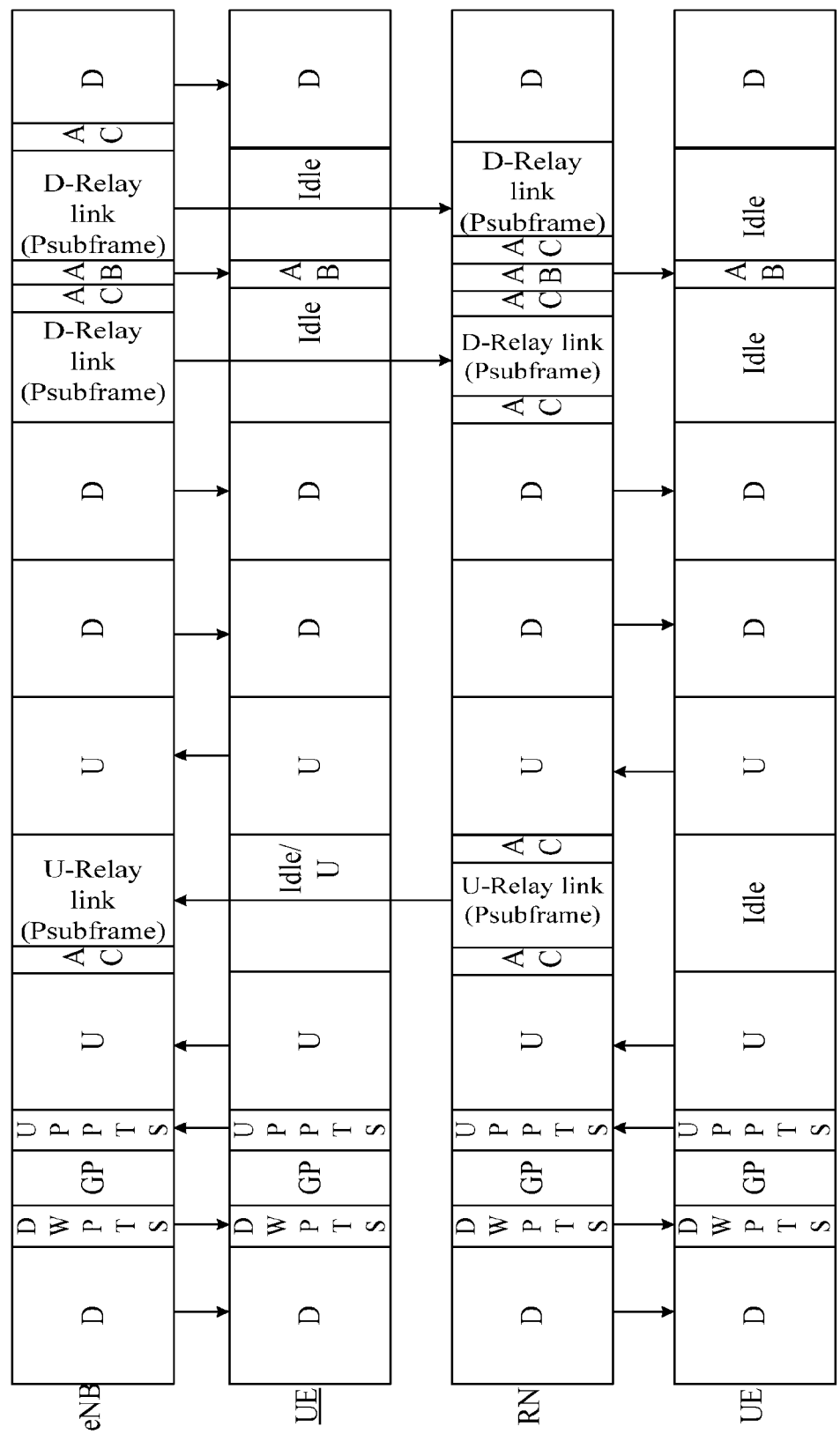
FIG. 7 is a schematic view of a frame structure according to an embodiment of the present invention.

FIG. 7 is a schematic view of a frame structure according to an embodiment of the present invention, where a ratio of DL subframes to UL subframes of an original LTE system including relay link and access link is 6:3. In the frame structure, a set of subframes that are configured for the relay link is [3, 7, 8]. In FIG. 7, a D-relay link (Psubframe) and a U-relay link (Psubframe) are a relay time used for communication between an RN and an eNB, the D-relay link represents a DL relay time of the communication between the RN and the eNB, and the U-relay link represents a UL relay time of the communication between the RN and the eNB. A communication part of the UL between the RN and the eNB may also be configured to transmit a UL control channel, a data channel, and a reference signal between a UE and the eNB. In FIG. 7, patterns AB represent access link for the eNB and a UE_eNB and access link for the RN and a UE_RN, which can be configured to send the reference signal, a DL control channel, a PCFICH, or a PHICH. For example, only the reference signal is sent, or the reference signal and control signaling such as the DL control channel, the PCFICH, or the PHICH are sent. Patterns AC of subframes of the relay link (Psubframe) may be used as a receive-transmit or transmit-receive transition time of the RN, and idle time such as a transmission time delay between the eNB and the RN. In all of the accompanying drawings of the embodiments of the present invention, all patterns AB being the same as patterns AB in FIG. 7 represent access link for the eNB and the UE_eNB and access link for the RN and the UE_RN; and all patterns AC being the same as patterns AC in FIG. 7 represent a receive-transmit or transmit-receive transition time of the RN, and idle time such as a transmission time delay between the eNB and the RN, which will not be repeated hereinafter.

Figure 8:
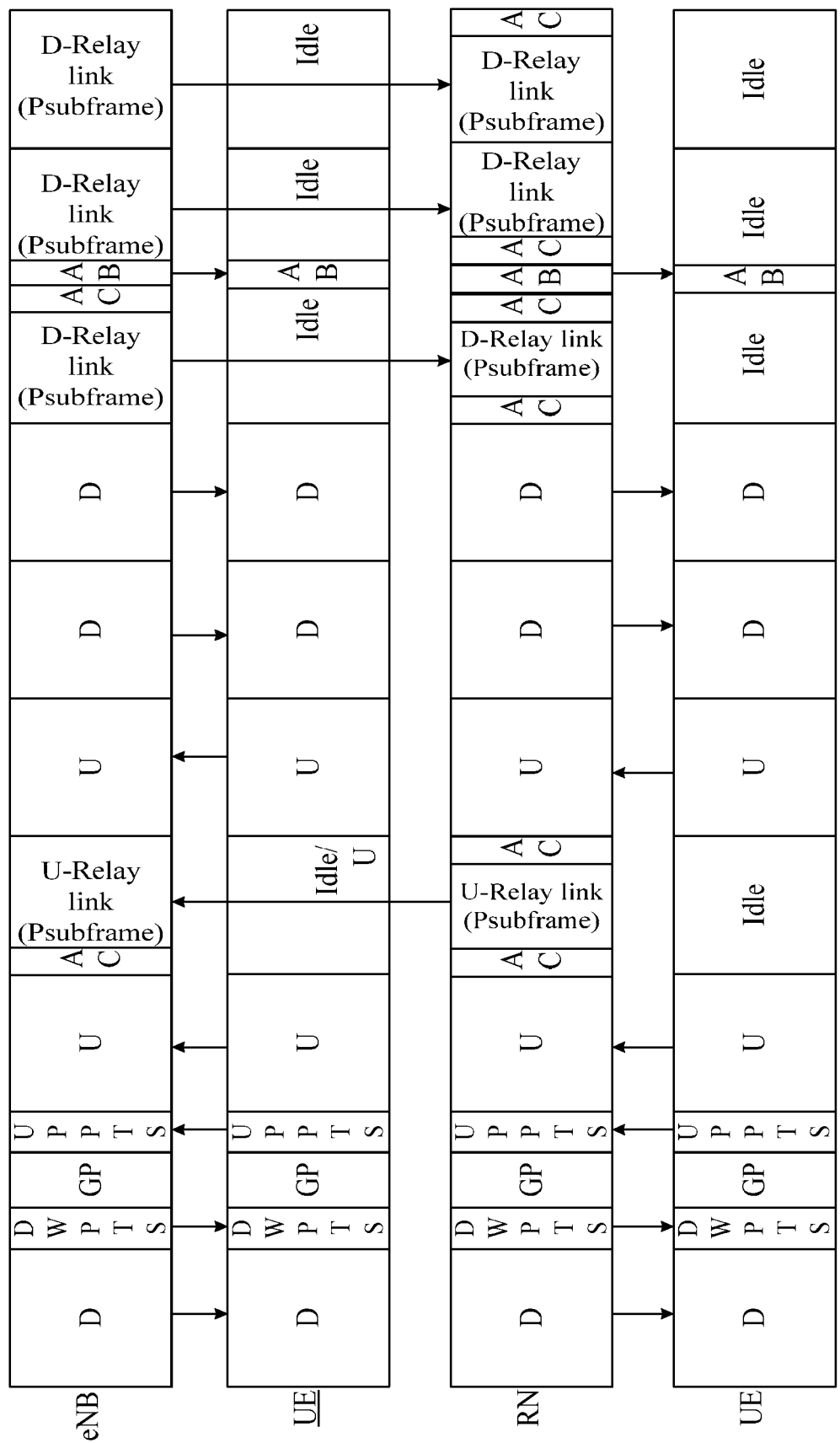
FIG. 8 is a schematic view of another frame structure according to an embodiment of the present invention.

FIG. 8 is a schematic view of another frame structure according to an embodiment of the present invention, where a ratio of DL subframes to UL subframes of an original LTE system including relay link and access link is 6:3. In the frame structure, a set of subframes that are configured for the relay link is [3, 7, 8, 9]. That is to say, subframe 3 is used for transmission from RN to eNB, and subframes 7, 8, and 9 are used for transmission from eNB to RN. That is, subframe 3 is configured for a UL subframe of relay link, and subframes 7, 8, and 9 are configured for DL subframes of relay link. The first several OFDM symbols of subframes 7, 8, and 9 may be configured to send control channels for the access link, for example, control signaling such as a UL grant, a PHICH, or a PCFICH, and/or a reference signal. When a UL subframe is used for the DL of a relay link, since communication between an RN and an eNB may causes serious interference on communication between a UE_eNB and an eNB of a neighbor cell, the feasibility of this action is low. When a DL subframe is used for the UL of the communication between the RN and the eNB, the interference on a UL direction from the eNB of the neighbor cell is relatively weaker than that when the UL subframe is used for the DL relay link, so that the DL subframe may be used for the UL relay link. As can be seen from Table 4, a UL grant sent in subframe 9 of a previous frame corresponds to a PUSCH sent in subframe 3. If subframe 9 is changed into the UL, no UL grant exists in subframe 3, a PHICH is not needed to sent in subframe 9, subframe 7 may be configured for transmission from eNB to RN, that is, the DL of the relay link, and subframe 9 may be configured for transmission from RN to eNB, that is, the UL of the relay link. In order not to waste resources of subframe 3, first several OFDM symbols of subframe 9 may be configured to send control channels, for example, control signaling such as the UL grant of subframe 3 of a next frame, the PHICH, or the PCFICH, and/or the reference signal. The sending of the reference signal also facilitates channel estimation interpolation between access link subframes.

Figure 9:
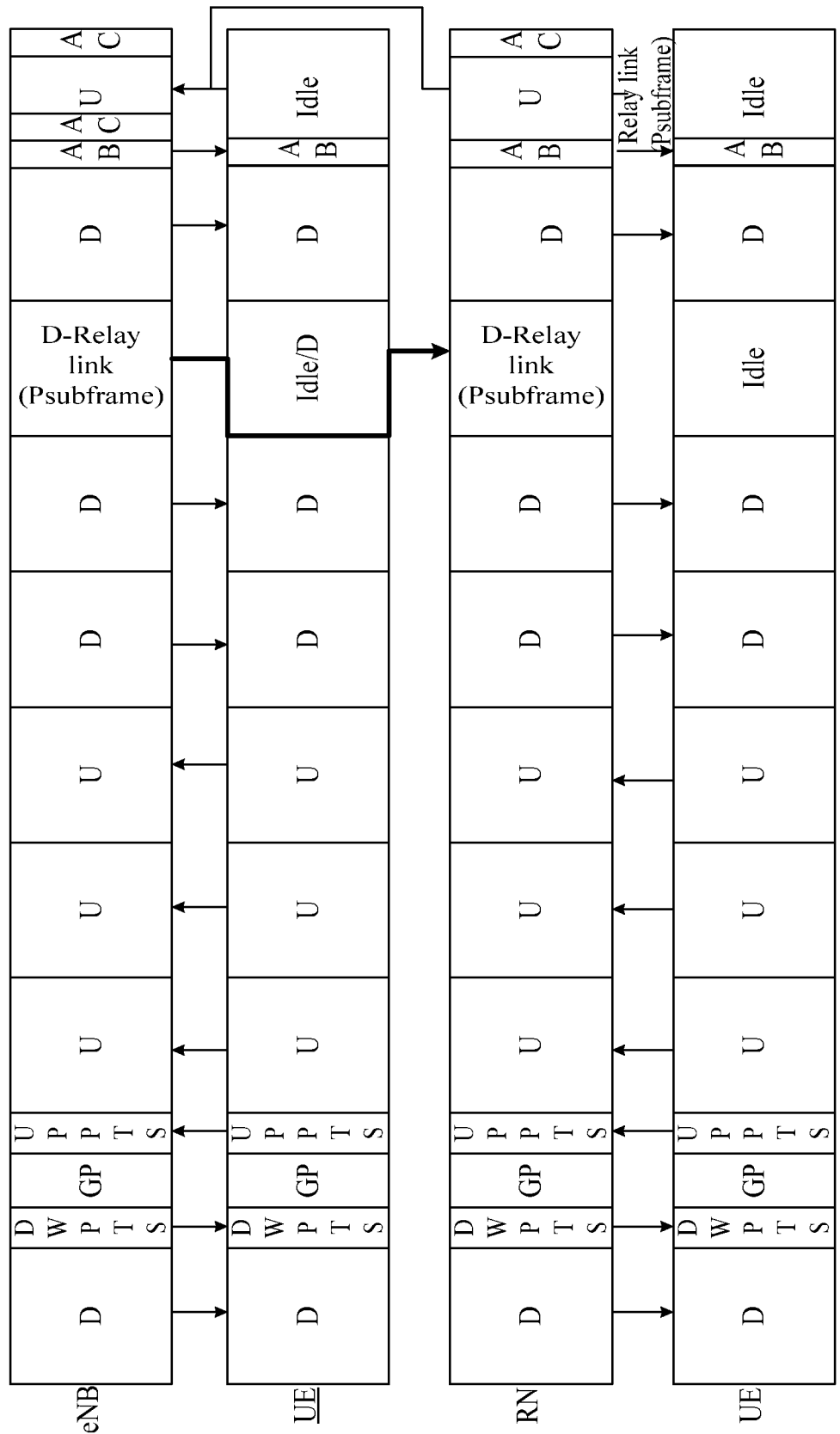
FIG. 9 is a schematic view of another frame structure according to an embodiment of the present invention.

FIG. 9 is a schematic view of another frame structure according to an embodiment of the present invention, where a ratio of DL subframes to UL subframes of an original LTE system including relay link and access link is 6:3. In the frame structure, a set of subframes that are configured for the relay link is [7, 9]. Subframe 7 may be configured for a DL subframe of relay link, and subframe 9 may be configured for a UL subframe of relay link; or in a reversed manner, subframe 7 may be configured for a UL subframe of relay link, and subframe 9 may be configured for a DL subframe of relay link. Specifically, when subframes 0, 1, 2, 3, 4, 5, 6, and 8 are respectively used for UL and DL access link between an eNB and a UE_eNB, and UL and DL access link between an RN and a UE_RN. The eNB and the UE_eNB send a control channel, a data channel, and a reference signal channel to each other on the access link. On the DL access link, the eNB further sends a broadcast channel and a synchronization channel. The RN and the UE_RN send a control channel, a data channel, and a reference signal channel to each other on the access link. On the DL access link, the RN further sends a broadcast channel and a synchronization channel. In the subframe of the relay link, for example, subframe 9 in the frame structure shown in FIG. 9, for the eNB, the first 1 to 4 OFDM symbols of the subframe are used by the eNB to send the reference signal and/or control channel to a UE under the eNB, an immediate following part is a transmit-receive transition time of the eNB, a next following part is a relay link (Psubframe) time, and a still next following part is a receive-transmit transition time of the eNB. For the RN, the first 1, 2, 3, or 4 OFDM symbols of the subframe are used by the eNB and the RN to send control signaling such as a control channel, a PHICH, and a PCFICH, and/or a reference signal to an UE under the eNB and an UE under the RN respectively. The sending of the reference signal also facilitates channel estimation interpolation between access link subframes. An immediate following part is a relay link Psubframe time of the RN, which is followed by a transmit-receive transition time of the RN. The transition time takes into account a time in which the eNB can effectively receive a relay area Psubframe. According to requirements on services and system capacity, the Psubframe may exist in multiple subframes, and is a part of the subframe. In addition, in the frame structure with the ratio of the DL subframes to the UL subframes of the original LTE system including the relay link and the access link being 6:3, a set of subframes that are configured for the relay link is [7, 8]. Subframe 7 may be configured for a DL subframe of relay link, and subframe 8 may be configured for a UL subframe of relay link; or in a reversed manner, subframe 7 may be configured for a UL subframe of relay link, and subframe 8 may be configured for a DL subframe of relay link. Or, one or more among subframes [3, 7, 8, 9] are configured for DL subframes of relay link, the rest subframes are used as UL subframes of relay link, the number of the subframes used as the UL subframes of relay link is greater than or equal to 1, and subframe 3 can only be used as the UL subframe of relay link.

It can be clearly seen that, in this embodiment, in the frame structure with the ratio of the DL subframes to the UL subframes being 6:3, subframes are configured for relay link transmission, data transmission performed by using the relay link complies with inherent constraints of Rel-8 of the LTE system with the ratio being 6:3, and coverage of an LTE/LTE-A system using an LTE/LTE-A TDD relay frame is expanded, thus improving the throughput.

An embodiment of the present invention provides a frame structure, where a ratio of LTE/LTE-A TDD frames is a ratio of DL subframes to UL subframes being 3:1. In this embodiment, a correspondence relation between a UL grant and a PUSCH is shown in Table 6. For example, if a UE receives a UL grant of a PDCCH in subframe 3, the UE sends a PUSCH in subframe 7 of this frame, and if the UE receives the UL grant in subframe 8, the UE sends the PUSCH in subframe 2 of a next frame.

TABLE 6

| TDD UL/DL Configuration | DL/UL ratio UL grant VS. PUSCH | Subframe index n | | | | | | | | | |
|---|---|---|---|---|---|---|---|---|---|---|---|
| | | 0 | 1 | 2 | 3 | 4 | 5 | 6 | 7 | 8 | 9 |
| 2 | 3:1 UL grant VS. PUSCH PUSCH Position | D | S | U | D G3-4 | D | D | S | U | D G8-4 | D |

A correspondence relation between a PHICH and a UL ACK/NACK is shown in Table 7. In Table 7, patterns being the same have a corresponding relation.

TABLE 7

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 2 PHICH position | | | 6 | 6 | | | | 6 | 6 | |
| | Subframe n | | | | | | | | | |
| Configuration | 0 | 1 | 2 | 3 | 4 | 5 | 6 | 7 | 8 | 9 |
| 2 UL ACK/NACK position | 7 | 6 | — | 4 8 7 6 4 | 8 | 7 | 6 | — | 4 7 6 4 8 | 8 |

In Table 7, subframes 0, 1, 5, and 6 are configured to send a broadcast channel and a synchronization channel, and are not configured for relay link. A UL ACK/NACK may be received in subframes 2 and 7 from the above subframes (a previous frame of this frame). When data is sent in subframes 2 and 7 of this frame, a PHICH is sent in subframe 8 correspondingly; and when data is sent in subframe 7 of a previous frame, a PHICH is sent in subframe 3 of this frame. Subframes 4 and 9 are required to be used for the DL and UL of the relay link. That is to say, one or more among subframes [3, 4, 8, and 9] may be configured for DL subframes of relay link, and the rest are used as UL subframes of relay link. The number of the subframes that are used as the UL subframes of relay link is greater than or equal to 1. Specifically, subframe 4 may be used for the DL of the relay link, that is, from the eNB to the RN; and subframe 9 may be used for the UL of the relay link, that is, from the RN to the eNB. Or in a reversed manner, subframe 4 is used as a UL subframe of relay link, and subframe 9 is used as a DL subframe of relay link.

Figure 10:
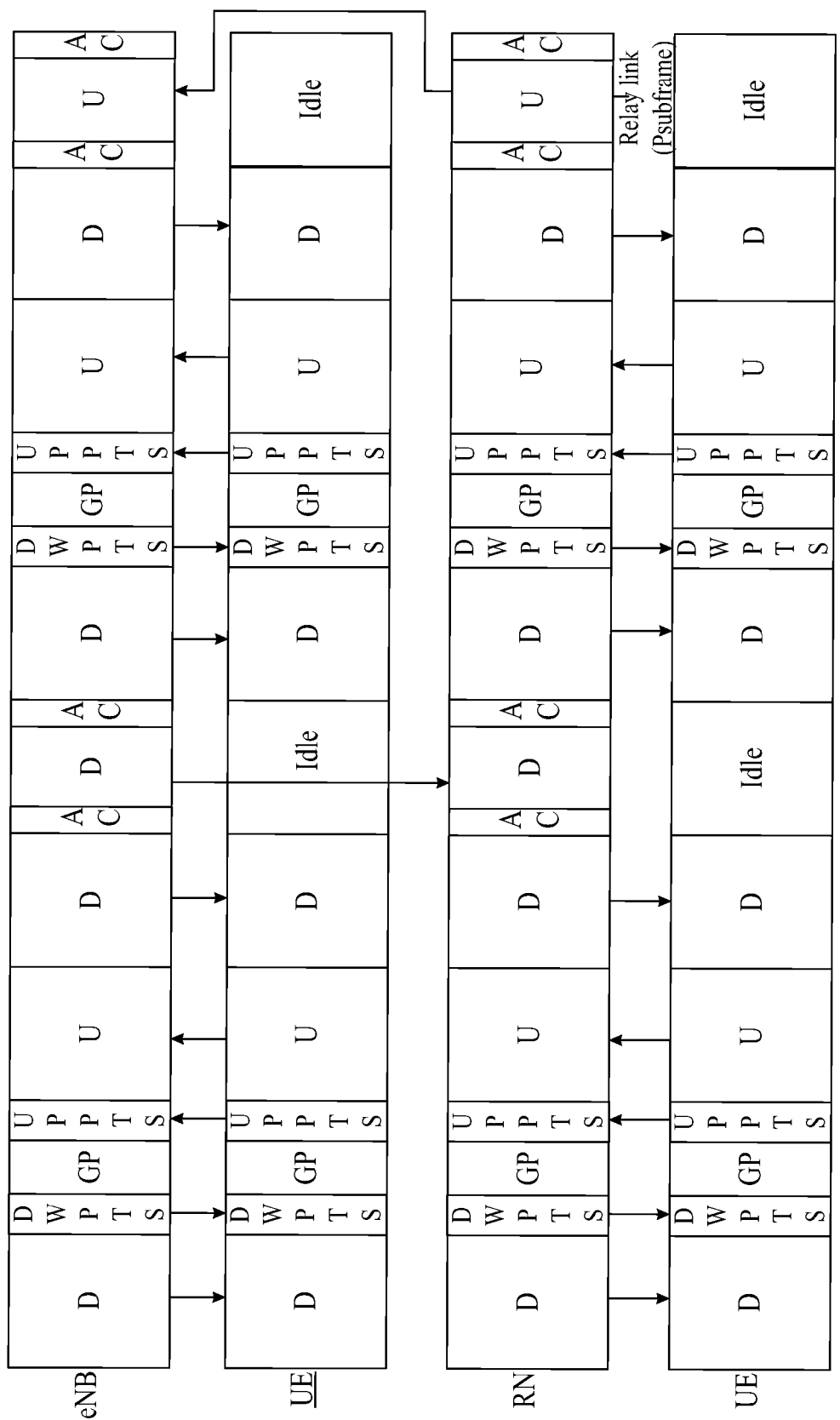
FIG. 10 is a schematic view of another frame structure according to an embodiment of the present invention.

FIG. 10 is a schematic view of another frame structure according to an embodiment of the present invention, where subframe 4 may be used for the DL of a relay link transmission, that is, from eNB to RN, and subframe 9 may be used for the UL of a relay link transmission, that is, from RN to eNB. Patterns AC in subframes 4 and 9 represent a transmit-receive transition time and a receive-transmit transition time of the RN. The length may be adjusted according to a distance from the eNB to the RN and an actual receive-transmit state transition time. Alternatively, when an original DL subframe is used as a relay subframe, first several OFDM symbols of the subframe may be used for access link transmission from eNB to UE and access link transmission from RN to UE, control signaling such as a DL control channel, a PCIFICH, or a PHICH, and/or a reference signal. The insertion of the reference signal facilitates channel estimation interpolation performed between a reference signal of a previous access link subframe and the reference signal, and also improves the channel estimation performance.

It can be clearly seen that, in this embodiment, in the frame structure with the ratio of the DL subframes to the UL subframes being 3:1, subframes are configured for relay link transmission, data transmission performed by using the relay link complies with inherent constraints of Rel-8 of the LTE system with the ratio being 3:1, and coverage of an LTE/LTE-A system using an LTE/LTE-A TDD relay frame is expanded, thus improving the throughput.

An embodiment of the present invention provides a frame structure, where a ratio of LTE/LTE-A TDD frames is a ratio of DL subframes to UL subframes being 7:2. In this embodiment, a correspondence relation between a PHICH and a UL ACK/NACK is shown in Table 8, and a correspondence relation of a UL grant and a PUSCH is shown in Table 9.

TABLE 8

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| PUSCH PHICH position | | | 6 | 6 | | | | | 6 | 6 |

| | Subframe n | | | | | | | | | |
|---|---|---|---|---|---|---|---|---|---|---|
| Configuration | 0 | 1 | 2 | 3 | 4 | 5 | 6 | 7 | 8 | 9 |
| PDSCH ULACK position | 12 | 11 | — | — | 8 | 7 | 7 | 6 | 5 | 4 |
| | | | 12 | 7 | | | | | | |
| | | | 11 | 6 | | | | | | |
| | | | 8 | 5 | | | | | | |
| | | | 7 | 4 | | | | | | |

TABLE 9

| TDD UL/DL Configuration | DL/UL ratio UL grant VS. PUSCH | Subframe index n | | | | | | | | | |
|---|---|---|---|---|---|---|---|---|---|---|---|
| | | 0 | 1 | 2 | 3 | 4 | 5 | 6 | 7 | 8 | 9 |
| 4 | 7:2 UL grant VS. PUSCH | D | S | U | U | D | D | D | D | D G8-4 | D G9-4 |

Figure 11:
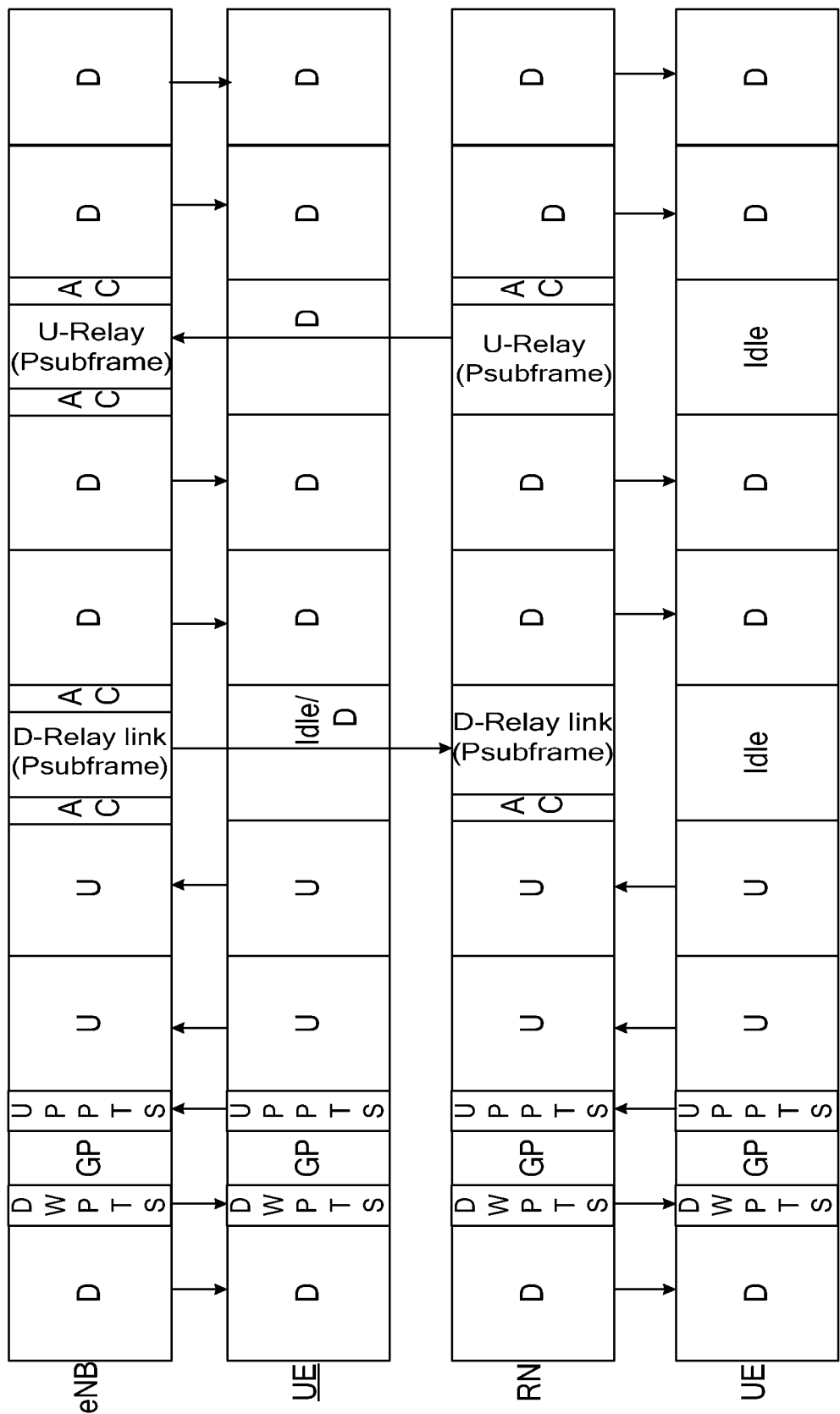
FIG. 11 is a schematic view of another frame structure according to an embodiment of the present invention.

As can be seen from Table 8 and Table 9, subframes 0, 1, 5, and 6 cannot be used for relay link, and the UL ACK/NACK corresponding to subframes 0, 1, 5, and 6 is sent in two UL subframes. Therefore, the DL subframes are configured for the DL of the relay link and the UL of the relay link, respectively. That is to say, one or more among subframes [4, 7, 8, 9] may be configured for DL subframes of relay link, and the rest may be used as UL subframes of relay link. The number of the subframes that are used as the UL subframes of relay link is greater than or equal to 1. FIG. 11 is a schematic view of another frame structure according to an embodiment of the present invention, where the frame structure includes relay link and access link. A DL subframe 4 may be configured for transmission from eNB to RN, and DL subframe 7 may be configured for transmission from RN to eNB; or, subframe 4 is used as a UL subframe of relay link, and subframe 7 is used as a DL subframe of relay link.

It can be clearly seen that, in this embodiment, in the frame structure with the ratio of the DL subframes to the UL subframes being 7:2, subframes are configured for relay link transmission, data transmission performed by using the relay link complies with inherent constraints of Rel-8 of the LTE system with the ratio being 7:2, and coverage of an LTE/LTE-A system using an LTE/LTE-A TDD relay frame is expanded, thus improving the throughput.

An embodiment of the present invention provides a frame structure, where a ratio of LTE/LTE-A TDD frames is a ratio of DL subframes to UL subframes being 2:2. Similarly, according to inherent constraints of LTE R-8 of the ratio, DL subframes [0, 1, 5, 6] and UL subframes [2, 7] are not suitable for relay link. Therefore, one or more among subframes [3, 4, 8, 9] may be configured for DL subframes of relay link, and the rest subframes are used as UL subframes of relay link. The number of the subframes that are used as the UL subframes of relay link is greater than or equal to 1, and subframe 3 and subframe 8 can only be used as UL subframes of relay link.

Figure 12:
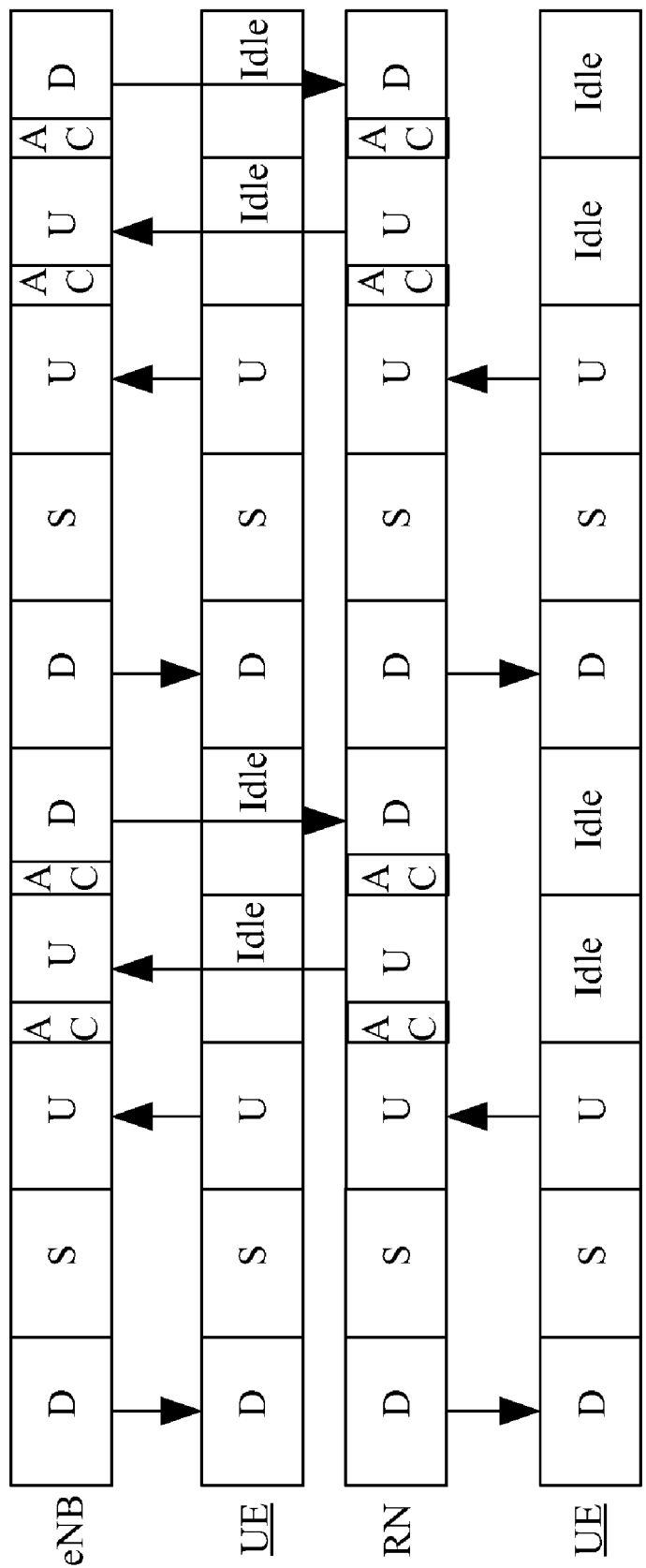
FIG. 12 is a schematic view of another frame structure according to an embodiment of the present invention.

FIG. 12 is a schematic view of another frame structure according to an embodiment of the present invention. In this embodiment, when two pairs of relay link exist in 10 ms, a relay receive-transmit transition time is placed in a subframe of the relay link. Since the value may be adjusted according to actual requirements, such as a distance from an RN to an eNB, and a receive-transmit/transmit-receive transition time, the relay receive-transmit transition time may also be placed in adjacent positions of the UL and DL relay subframes. Subframes of the relay link Psubframe are subframes [3, 4, 8, 9].

Figure 13:
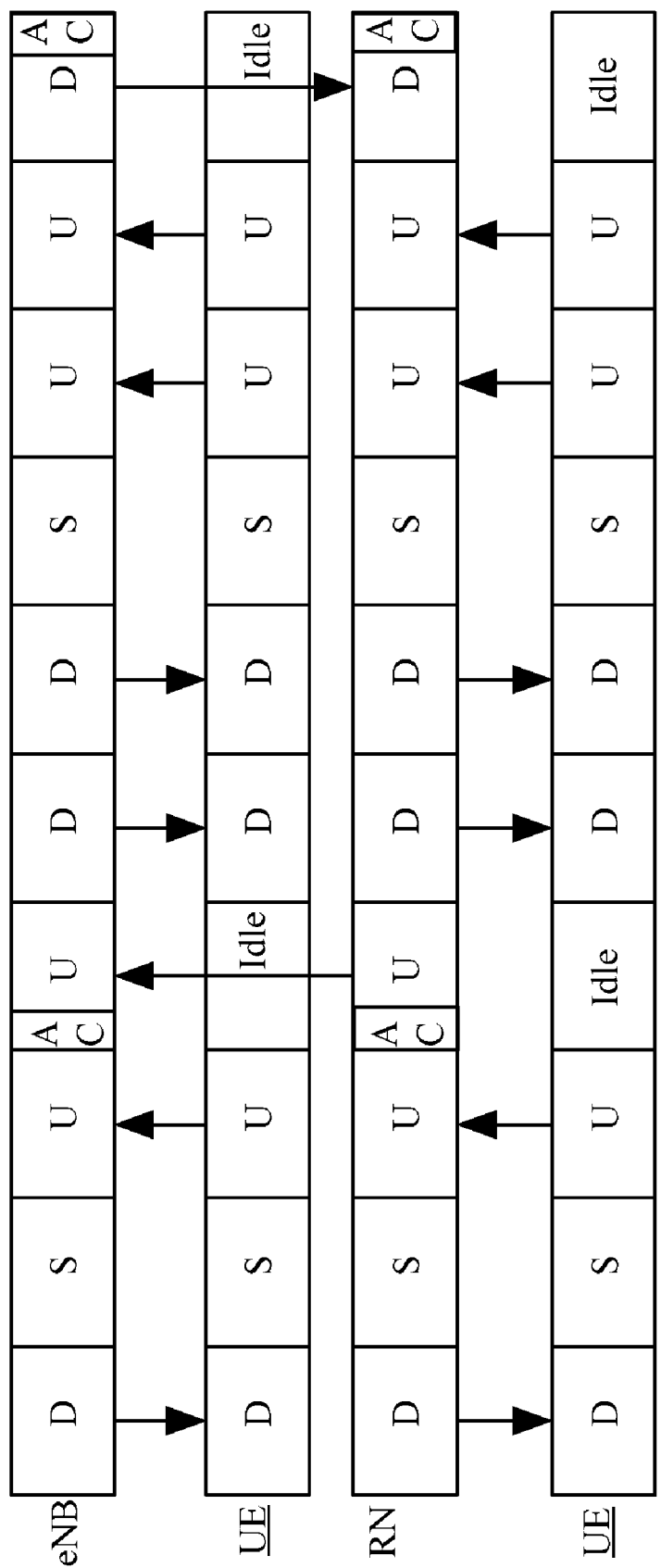
FIG. 13 is a schematic view of another frame structure according to an embodiment of the present invention.

The above 10 ms frame structure includes 2 pairs of relay link, and may also include only one pair of relay link. FIG. 13 is a schematic view of another frame structure according to an embodiment of the present invention, where a receive-transmit transition time of the relay link may be indicated in the frame structure implicitly, that is, by informing an RN transmission time or an end time of receiving an eNB, and the receive-transmit transition time of the relay link may also be identified by areas AC in the figure explicitly. In the figure, a set is [3, 9], that is, subframe 9 is used for transmission from eNB to RN, and subframe 3 is used for transmission from RN to eNB. Besides, when the set is [4, 8], subframe 4 is configured for a DL subframe of relay link, and subframe 8 is configured for a UL subframe of relay link; and when the set is [3, 4, 8, 9], subframes 4 and 9 are configured for DL subframes of relay link, and subframes 3 and 8 are configured for UL subframes of relay link.

It can be clearly seen that, in this embodiment, in the frame structure with the ratio of the DL subframes to the UL subframes being 2:2, subframes are configured for relay link transmission, data transmission performed by using the relay link complies with inherent constraints of Rel-8 of the LTE system with the ratio being 2:2, and coverage of an LTE/LTE-A system using an LTE/LTE-A TDD relay frame is expanded, thus improving the throughput.

Figure 14:
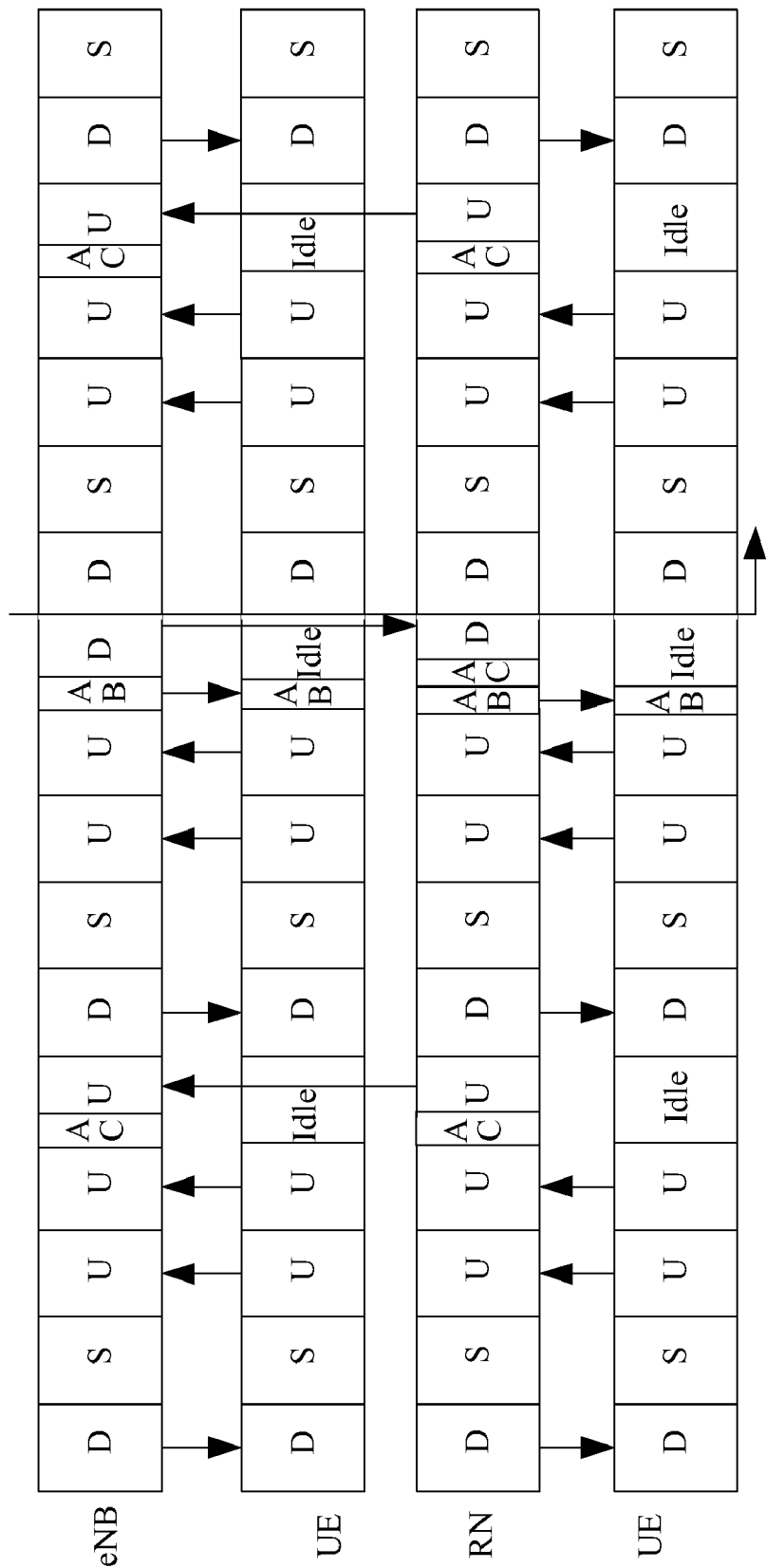
FIG. 14 is a schematic view of another frame structure according to an embodiment of the present invention.

FIG. 14 is a schematic view of another frame structure according to an embodiment of the present invention, where a ratio of LTE/LTE-A TDD frames is a ratio of DL subframes to UL subframes being 3:5. As shown in FIG. 14, a set [4, 9] is subframes of relay link Psubframe. Sub-frame 4 is a UL for RN->eNB, subframe 9 is a DL for eNB->RN, and a control channel similar to the above exists in subframe 9. Since a subframe of relay link is near to a UL-DL transition position of an original system, and the original system has a GP, the GP may not be shown in the figure. Patterns AB in the front of subframes 9 respectively represent access link transmission from eNB to UE_eNB and access link transmission from RN to UE_RN, and the length thereof may be one among 1, 2, 3, or 4 symbols, so that a reference signal can be sent, or a reference signal and control signaling such as a DCCH, a PHICH, or a PCFICH can be sent.

It can be clearly seen that, in this embodiment, in the frame structure with the ratio of the DL subframes to UL subframes being 3:5, subframes are configured for relay link transmission, data transmission performed by using the relay link complies with inherent constraints of Rel-8 of the LTE system with the ratio being 3:5, and coverage of an LTE/LTE-A system using an LTE/LTE-A TDD relay frame is expanded, thus improving the throughput.

An embodiment of the present invention provides a frame structure, where a ratio of LTE/LTE-A TDD frames is a ratio of DL subframes to UL subframes being 8:1. Similarly, according to inherent constraints of LTE R-8 of the ratio, DL subframes [0, 1, 5, 6] and UL subframe [2] are not suitable for relay link. Therefore, one or more among subframes [3, 4, 7, 8, 9] may be configured for DL subframes of relay link, and the rest subframes are used as UL subframes of relay link. The number of the subframes that are used as the UL subframes of relay link is greater than or equal to 1.

Figure 15:
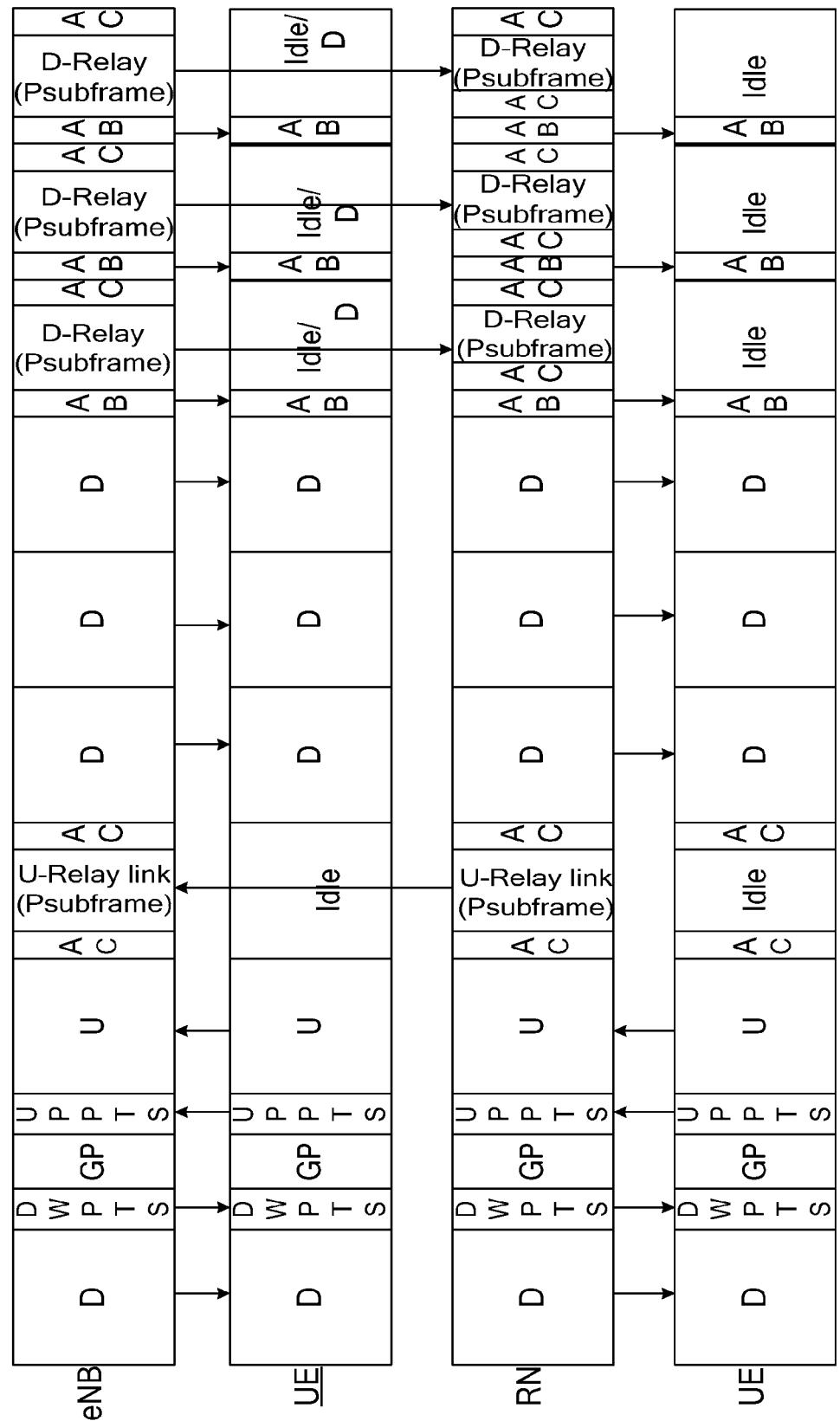
FIG. 15 is a schematic view of another frame structure according to an embodiment of the present invention.

FIG. 15 is a schematic view of another frame structure according to an embodiment of the present invention, where a ratio of LTE/LTE-A TDD frames is a ratio of DL subframes to UL subframes being 8:1. DL subframe 3 is configured for a UL relay link from an RN to an eNB, DL subframes [7, 8, 9] are configured for a DL relay link from the eNB to the RN, and all of DL subframes [7, 8, 9] are MBSFN subframes. For the DL subframes, the very first, or first two, or first three OFDM symbols of each of the subframes are a unicast part, and the rest of the time is for relay link transmission between the RN and the eNB, and a GP (indicated by patterns AC). The unicast of DL subframe 8 is configured to send a DL reference signal, a control channel, a PCFICH, and a PHICH. The unicast of DL subframe 7 and DL subframe 8 is configured to send a DL reference signal.

In the frame structure according to the embodiment of the present invention, the original DL subframes for the UL or DL relay link may also be the MBSFN subframes in an LTE/LTE-A TDD system, and the unicast parts of the MBSFN subframes are configured to send the DL reference signal and/or control signaling, such as a control channel, a PCFICH, and a PHICH. The rest of the time is used for the relay link transmission between the RN and the eNB, and the GP. The method is applicable in other cases with other ratios, which is not described herein again.

In all of the above embodiments, the GP of the relay subframe includes the GP of the DL relay subframe and the GP of the UL relay subframe. For the GP of the DL relay subframe, as shown by subframes 7 and 8 in FIG. 7, when the transmission time (the idle time) is longer than the transition time (the receive-transmit or the transmit-receive transition time of the RN), for the relay frame of the RN, for example, subframe 7 of the Psubframe, the GP in the subframe is required to be divided into two parts: a GP RGPf before the Psubframe (a first part of a relay GP) and a GP RGPb after the Psubframe (a second part of the relay GP). The GP RGPf before the Psubframe=the transmission time (the transmission time from the RN to the eNB, which is referred to as the transmission time for short hereinafter). The GP after the Psubframe=the transmit-receive transition time of the RN (which is referred to as the RN transition time for short hereinafter). In FIG. 7, for relay subframe 7 corresponding to the relay frame of the eNB, RGPf=0, RGPb=the transmission time+the receive-transmit transition time of the RN (which is referred to as the RN transition time for short hereinafter). In all of the above embodiments, the method for determining the GP is the same when the DL subframe is used as the relay subframe. When the transmission time is shorter than the transition time, for relay subframe 7 of the relay frame of the RN, RGPf=the RN transition time, and RGPb=the RN transition time. For relay subframe 7 corresponding to the relay frame of the eNB, RGPf=0, RGPb=the RN transition time+ the RN transition time.

The GP of the UL relay subframe includes the GP of the DL subframe used as the UL relay subframe and the GP of the UL subframe used as the UL relay subframe. For the GP of the DL subframe used as the UL relay subframe, for example, subframe 9 in FIG. 9, when the transmission time is longer than the transition time, in subframe 9 of the RN relay frame, RGPf=the RN transition time, and RGPb=the transmission time; and in subframe 9 of the eNB relay frame, RGPf=the RN transition time+the transmission time, and RGPb=0. When the transmission time is shorter than the transition time, in subframe 9 of the RN relay frame, RGPf=the RN transition time, and RGPb=the transition time; and in subframe 9 of the eNB relay frame, RGPf=the RN transition time+the transmission time, and RGPb=the transition time−the transmission time. The GP of the UL subframe used as the UL relay subframe is as shown by subframe 3 in FIG. 7. When the transmission time is longer than the transition time, in subframe 3 of the RN relay frame, RGPf=the RN transition time, and RGPb=the transmission time; and in subframe 3 of the eNB relay frame, RGPf=the RN transition time+the transmission time, and RGPb=0. When the transmission time is shorter than the transition time, in subframe 3 of the RN relay frame, RGPf=the RN transition time, and RGPb=the transition time; and in subframe 3 of the eNB relay frame, RGPf=the RN transition time+the transmission time, and RGPb=the transition time−the transmission time.

The GP formed by one or more among the above transition time, the transmission time, and the idle time may also be adjusted by a transmitter and a receiver in signaling, for example, regularly, and not indicated in the frame structure.

Figure 16:
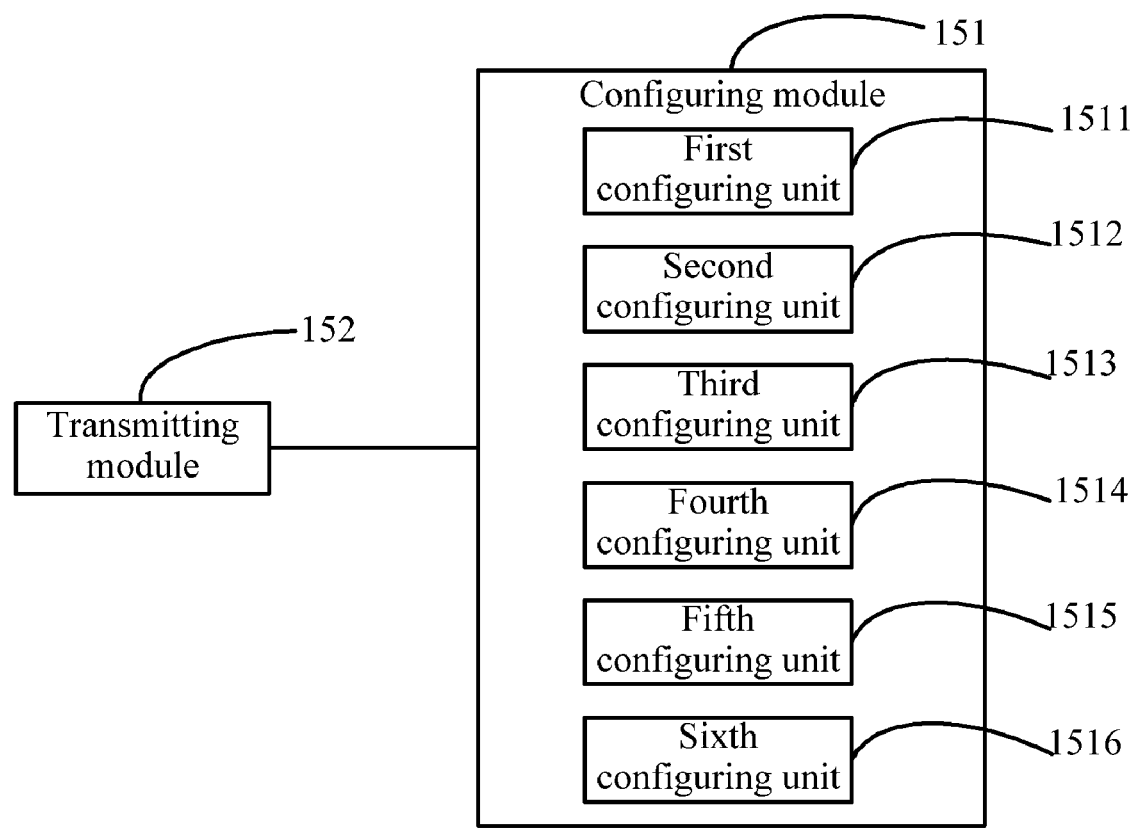
FIG. 16 is a schematic structural view of a communication apparatus according to an embodiment of the present invention.

FIG. 16 is a schematic structural view of a communication apparatus according to an embodiment of the present invention. As shown in FIG. 16, the communication apparatus includes a configuring module 151 and a transmitting module 152. The configuring module 151 is configured to configure a subframe of a TDD relay frame for a subframe of relay link. The configuring the subframe of the TDD relay frame for the subframe of relay link includes: configuring a DL subframe of the TDD relay frame for a DL subframe of relay link, and/or configuring the DL subframe of the TDD relay frame for a UL subframe of relay link, and/or configuring a UL subframe of the TDD relay frame for the UL subframe of relay link. The transmitting module 152 is configured to perform relay transmission according to the subframe of relay link configured by the configuring module 151.

When the relay transmission is performed according to the configured subframe of relay link, if the DL subframe of the relay frame is used as the UL subframe of relay link or the DL subframe of relay link, the first N OFDM symbols of the DL subframe are configured for access link transmission between a RN and a UE under the RN or between an eNB and a UE under the eNB, and are configured to send a DL reference signal, or a DL reference signal and control signaling. Other OFDM symbols of the DL subframe are used for relay link transmission and/or a GP; that is to say, the time other than the first N OFDM symbols of the DL subframe is used for the relay link transmission and/or the GP, and may also be used for the access link transmission between the eNB and the UE under the eNB.

The DL subframe includes M OFDM symbols, M and N are natural numbers, and N is smaller than M.

The solution provided by the embodiment of the present invention can be applied to systems such as LTE, LTE-A, all versions of the LTE (such as Rel-8, Rel-9, and Rel-10), WiMax, and UWB.

Taking an LTE/LTE-A system for example, in the embodiment of the present invention, the configuring module 151 further includes a first configuring unit 1511, a second configuring unit 1512, a third configuring unit 1513, a fourth configuring unit 1514, a fifth configuring unit 1515, and a sixth configuring unit 1516.

When a ratio of DL subframes to UL subframes is 6:3, the first configuring unit 1511 is configured to configure subframe 3 for a UL subframe of relay link, and configure subframes 7 and 8 for DL subframes of relay link; or, configure subframe 3 for the UL subframe of relay link, and configure subframes 7 and 8 and subframe 9 for the DL subframes of relay link; or, configure subframe 7 for the DL subframe of relay link, and configure subframe 9 for the UL subframe of relay link; or, configure subframe 7 for the UL subframe of relay link, and configure subframe 9 for the DL subframe of relay link; or, configure subframe 7 for the DL subframe of relay link, and configure subframe 8 for the UL subframe of relay link; or, configure subframe 7 for the UL subframe of relay link, and configure subframe 8 for the DL subframe of relay link; or, configure one or more among subframes [3, 7, 8, 9] for the DL subframes of relay link, and configure the rest subframes for the UL subframes of relay link. The number of the subframes that are used as the UL subframes of relay link is greater than or equal to 1, and subframe 3 can only be used as the UL subframe of relay link.

When the ratio of the DL subframes to the UL subframes is 3:1, the second configuring unit 1512 is configured to configure subframe 4 for the DL subframe of relay link, and configure subframe 9 for the UL subframe of relay link; or, configure subframe 4 for the UL subframe of relay link, and configure subframe 9 for the DL subframe of relay link; or, configure one or more among subframes [3, 4, 8, 9] for the DL subframes of relay link, and configure the rest for the UL subframes of relay link. The number of the subframes that are used for the UL subframes of relay link is greater than or equal to 1.

When the ratio of the DL subframes to the UL subframes is 7:2, the third configuring unit 1513 is configured to configure subframe 4 for the DL subframe of relay link, and configure subframe 7 for the UL subframe of relay link; or, configure subframe 4 for the UL subframe of relay link, and configure subframe 7 for the DL subframe of relay link; or, configure one or more among subframes [4, 7, 8, 9] for the DL subframes of relay link, and configure the rest for the UL subframes of relay link. The number of the subframes that are used as the UL subframes of relay link is greater than or equal to 1.

When the ratio of the DL subframes to the UL subframes is 2:2, the fourth configuring unit 1514 is configured to configure subframe 9 for the DL subframe of relay link, and configure subframe 3 for the UL subframe of relay link; or, configure subframe 4 for the DL subframe of relay link, and configure subframe 8 for the UL subframe of relay link; or, configure subframes 4 and 9 for the DL subframes of relay link, and configure subframes 3 and 8 for the UL subframes of relay link; or, configure one or more among subframes [3, 4, 8, 9] for the DL subframes of relay link, and configure the rest subframes for the UL subframes of relay link. The number of the subframes that are used as the UL subframes of relay link is greater than or equal to 1, and subframes 3 and 8 can only be used as the UL subframes of relay link.

When the ratio of the DL subframes to the UL subframes is 3:5, the fifth configuring unit 1515 is configured to configure subframe 9 for the DL subframe of relay link, and configure subframe 4 for the UL subframe of relay link.

When the ratio of the DL subframes to the UL subframes is 8:1, the sixth configuring unit 1516 is configured to configure one or more among subframes [3, 4, 7, 8, 9] for the DL subframes of relay link, and configure the rest for the UL subframes of relay link. The number of the subframes that are used as the UL subframes of relay link is greater than or equal to 1.

The communication apparatus in the embodiment of the present invention is applicable to all of the methods of the above embodiments. In the embodiment of the present invention, when the communication apparatus transmits data, the subframe that can be used for the relay link transmission is configured, data transmission performed by using the relay link complies with inherent constraints of the TDD frame structure in the prior art, and coverage of a system using the TDD relay frame is expanded, thus improving the throughput.

Through the above description of the implementation, it is clear to persons skilled in the art that the present invention may be accomplished through hardware, or through software plus a necessary universal hardware platform. Base on this, the technical solutions of the present invention may be embodied in the form of a software product. The software product may be stored in a nonvolatile storage media (for example, CD-ROM, USB flash drive, or removable hard disk) and contain several instructions configured to instruct computer equipment (for example, a personal computer, a server, or network equipment) to perform the method according to the embodiments of the present invention.

The above descriptions are merely some exemplary embodiments of the present invention. It should be noted by persons of ordinary skill in the art that modifications and improvements may be made without departing from the principle of the present invention, which should be construed as falling within the scope of the present invention.

What is claimed is:
1. A relay transmission method, comprising:
performing, by a relay node (RN), transmission between the RN and a base station on a relay link, the relay link comprising an uplink (UL) relay link from the RN to the base station and a downlink (DL) relay link from the base station to the RN;

wherein a time division duplex (TDD) frame comprises ten subframes that are labeled as 0 to 9 from a first subframe to a tenth subframe, subframe 3 of the TDD frame is configured for the UL relay link, subframes 7, 8 and 9 of the TDD frame are configured for the DL relay link, subframes 0, 5, 6, 7, 8 and 9 of the TDD frame are downlink subframes, subframes 2, 3 and 4 of the TDD frame are uplink subframes, and subframe 1 of the TDD frame is a special subframe.

2. The method according to claim 1, wherein each subframe configured for the DL relay link comprises M Orthogonal Frequency Division Multiplexing (OFDM) symbols, the first N OFDM symbols of each subframe configured for the DL relay link being configured for access link transmission, wherein M and N are natural numbers and N is smaller than M.

3. An apparatus, comprising:
a processor, configured to process a time division duplex (TDD) frame that comprises ten subframes that are labeled as 0 to 9 from a first subframe to a tenth subframe, wherein subframe 3 of the TDD frame is configured for an uplink (UL) relay link and subframes 7, 8 and 9 of the TDD frame are configured for a downlink (DL) relay link, wherein the UL relay link is from a relay node (RN) to a base station and the DL relay link is from the base station to the RN, and wherein subframes 0, 5, 6, 7, 8 and 9 of the TDD frame are downlink subframes, subframes 2, 3 and 4 of the TDD frame are uplink subframes, and subframe 1 of the TDD frame is a special subframe; and a memory coupled to the processor.

4. A communication apparatus, comprising:
a transmitter, configured to transmit data to a base station on an uplink (UL) relay link, the UL relay link being from the communication apparatus to the base station, subframe 3 of a time division duplex (TDD) frame is configured for the UL relay link, wherein the TDD frame comprises ten subframes that are labeled as 0 to 9 from a first subframe to a tenth subframe, subframes 0, 5, 6, 7, 8 and 9 of the TDD frame being downlink subframes, subframes 2, 3 and 4 of the TDD frame being uplink subframes, and subframe 1 of the TDD frame being a special subframe; and a receiver, configured to receive data sent from the base station on a downlink (DL) relay link from the base station to the communication apparatus, wherein subframes 7, 8 and 9 of the TDD frame are configured for the DL relay link.

5. The communication apparatus according to claim 4, further comprising:
a processor, configured to configure subframe 3 of the TDD frame for the UL relay link and to configure subframes 7, 8 and 9 of the TDD frame for the DL relay link.

* * * * *